Sept. 15, 1959     D. C. MacDONALD     2,903,901
TRANSMISSION
Filed Feb. 25, 1957                                          4 Sheets-Sheet 1
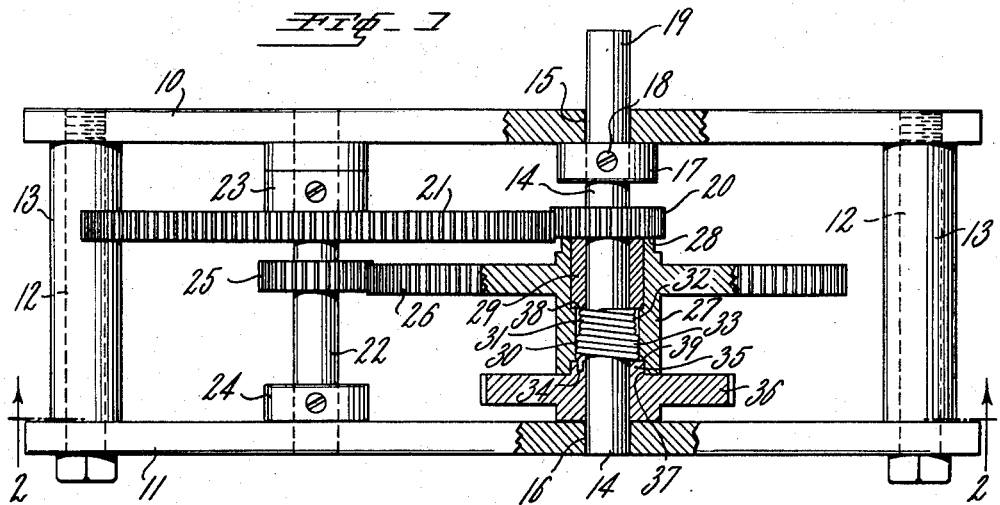
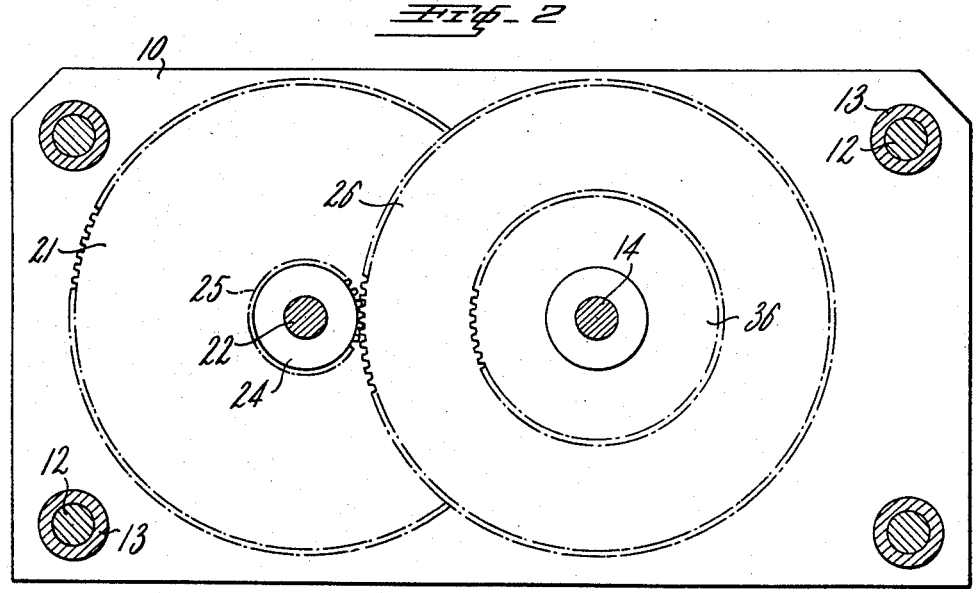
INVENTOR.
DONALD C. MacDONALD
BY
ATTORNEY

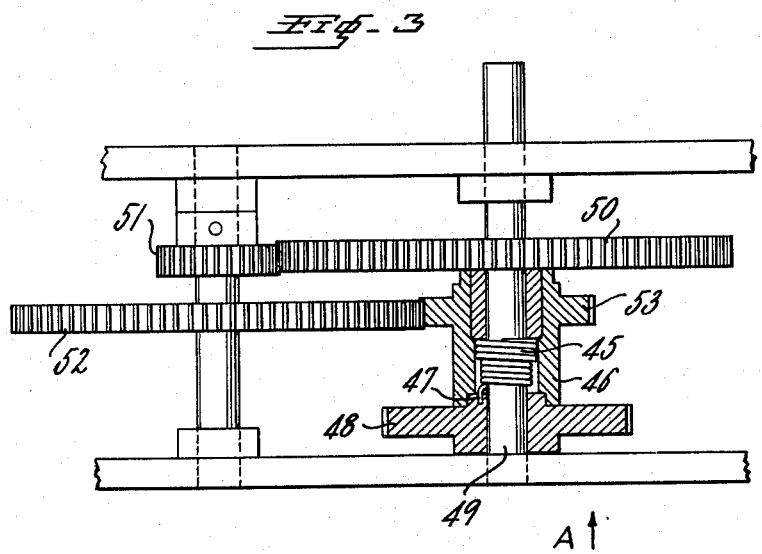
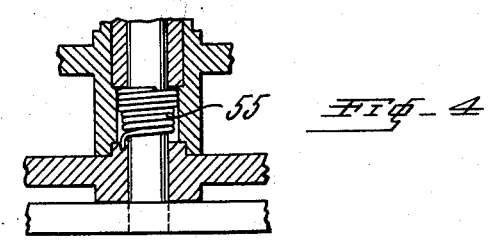
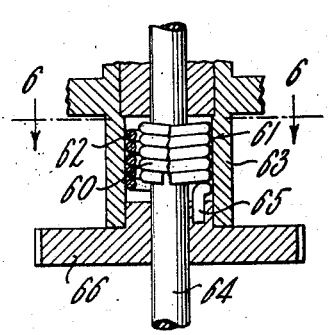
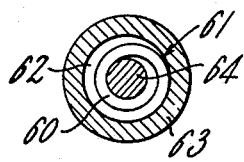

Sept. 15, 1959　　　D. C. MacDONALD　　　2,903,901
TRANSMISSION
Filed Feb. 25, 1957　　　　　　　　　　　4 Sheets-Sheet 3
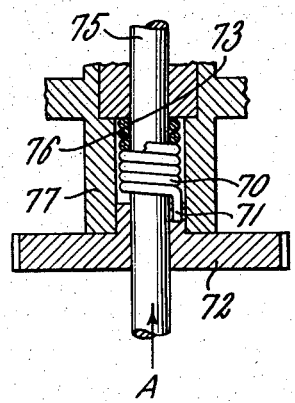
Fig-7
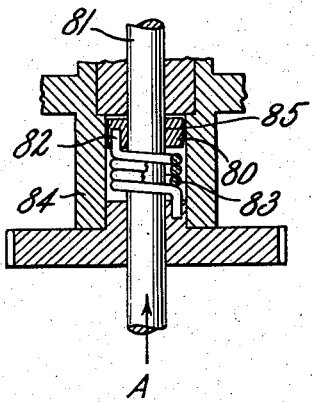
Fig-8
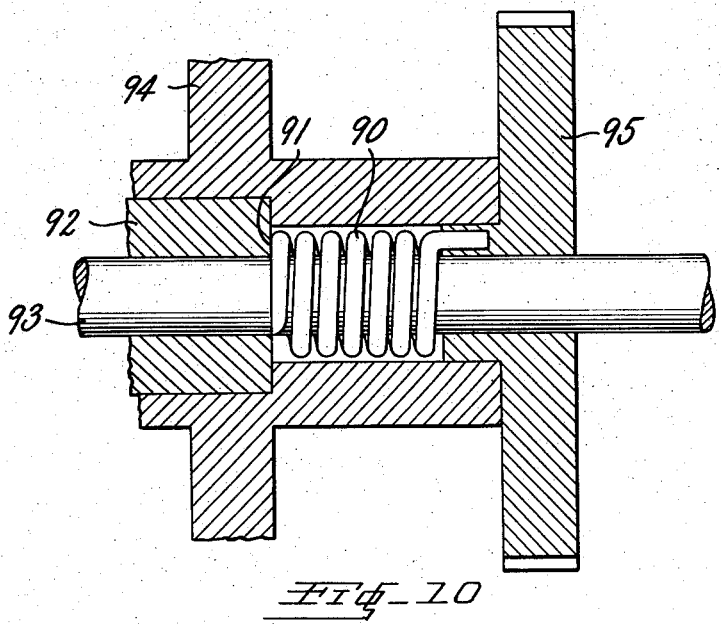
Fig-10
INVENTOR.
DONALD C. MacDONALD
BY
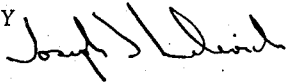
ATTORNEY

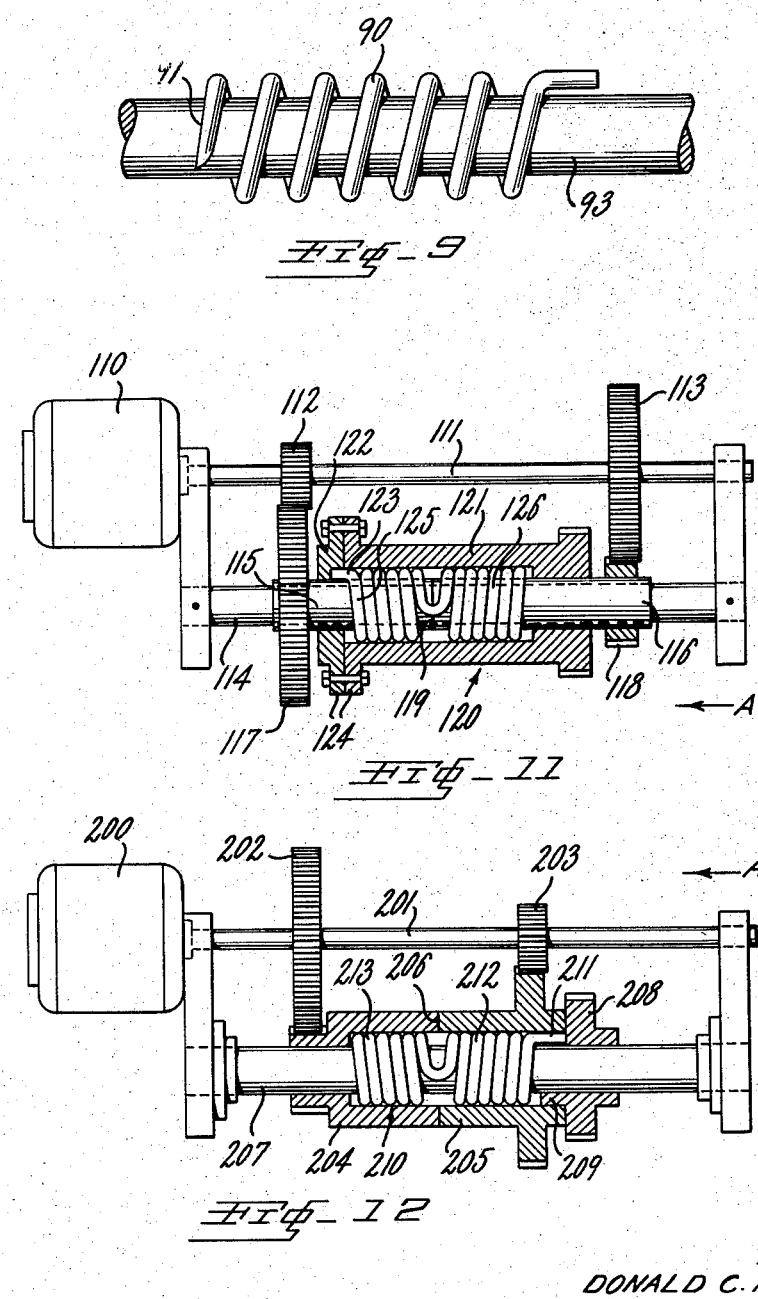

United States Patent Office 2,903,901
Patented Sept. 15, 1959

2,903,901

TRANSMISSION

Donald C. MacDonald, Ridgewood, N.J., assignor to United States Rubber Company, New York, N.Y., a corporation of New Jersey Application February 25, 1957, Serial No. 642,155

9 Claims. (Cl. 74—368)

This invention relates to an improved transmission, and more particularly it relates to a device for transmitting rotary motion in one direction at a given speed or in a reverse direction at another speed.

This application is a continuation-in-part of my copending application Serial No. 453,017, filed August 30, 1954.

In certain mechanical devices such as machine tool drives, transportation transmissions, lift drives and the like, it is desirable to be able to convert quickly from a definite forward speed into a reverse speed that is different from the forward speed. Thus, for example, recording instruments frequently have a pen that traverses a chart in a given direction at a definite synchronous speed. Upon reaching the end of its travel, it is desirable to return the pen quickly to its starting position. This requires a quick change from a comparatively slow forward speed to a high reverse speed. The devices heretofore available for accomplishing such a simultaneous change in direction and speed have been undesirably complex and bulky, and have generally not been completely self-contained or automatic in their action, but have required the intervention of some external adjusting agency to effect the desired changes. The present invention provides a highly simplified mechanism for obtaining the desired simultaneous change of speed and direction of output by simple reversal in the direction of rotation of the transmission input.

The apparatus of my invention comprises: (1) Two axially symmetrical input members, a high-speed input member and a low-speed input member, mounted to rotate about an axis (2) driving means adapted to simultaneously drive the high-speed input member at a relatively high speed and the low-speed input member at a relatively low speed in a common direction, and to reverse the direction of rotation of the two input members simultaneously without changing their respective rotational speeds (3) an output member, to which the load is connected, mounted to rotate about said axis (4) an axially symmetrical clutch which comprises a coil spring, with or without an actuating contact member attached rigidly to one end of the spring. The clutch is mounted with its axis on the axis of rotation of the input and output members. One end of the spring (called the bound end) is rigidly attached to the output member; the contact member, if present, is attached to the other end of the spring (called the free end). These various parts are so constructed and assembled that for one direction of rotation of the input members, the clutch grips the high-speed input member, while for the opposite direction of rotation, the clutch grips the low-speed input member, thereby driving the output member at the high or the low speed respectively.

The principles of design and operation of my invention will be discussed first in general terms, and then with reference to several embodiments. In describing the operation of my invention, reference will be made to contact surfaces of the clutch. The low-speed contact surface consists of at least a part of one of the axially symmetrical surfaces forming the envelope of the turns of the coil spring; it is close to, but not necessarily in contact with, a corresponding surface of the low-speed input member when the transmission is at rest. The high-speed contact surface consists of such a surface of the spring, either alone or together with the actuating surface of the contact member; at least a region of the high-speed contact surface must be at or near the free end of the spring, and must be in frictional contact with a corresponding surface of the high-speed input member when the transmission is at rest.

The operation of my invention depends on the fact that, when the input members are rotated, tangential forces are developed between the high-speed input member and the high-speed contact surface near the free end of the spring, tending to initiate or accelerate rotational motion of the clutch and the attached output member. Any similar forces which may develop between the low-speed input member and the clutch will have the same tendency. Inertia and friction in the output member and the load oppose the acceleration, resulting in a counter-acting tangential force exerted on the spring at its bound end. These oppositely directed tangential forces form a twisting couple which causes any given section of the spring to wind or to unwind (depending on the direction of rotation, and on the direction of winding of that section of the spring), and so to contract or to expand radially of the spring axis. These dimensional changes of the spring alter the frictional engagement of the input members with the spring. The manner of frictional engagement of the input members with the spring and the directions of winding of the spring sections are so chosen that, for one direction of rotation (called the high-speed direction), the high-speed contact surface of the spring is forced against and makes non-slipping connection with the high-speed input member, while the low-speed contact surface of the spring is withdrawn and withheld from contact with the low-speed input member, the clutch and output member thus being driven at the high speed in the high-speed direction. For the opposite direction of rotation (called the low-speed direction), the low-speed contact surface of the spring is forced against and makes non-slipping connection with the low-speed input member, while the high-speed contact surface of the spring is loosened from and slips upon the high-speed input member, the clutch and output member thus being driven at the low speed in the low-speed direction. Frictional forces in the output and the load maintain the twist in the spring, resulting in stable operation with either direction of rotation.

It should be noted that the contact surface of the clutch at the free end of the spring must be in contact with the high-speed input member, not the low-speed input member. This is clearly seen by considering in detail what will happen if a drive of this type, but having the low-speed input member in contact with the contact surface at the free end of the spring, is started up in the high-speed direction. The clutch and the output member are initially stationary, and the twisting couple acts as described in the preceding paragraph to force the spring against the high-speed input member, and thus to cause acceleration of the clutch by the high-speed input. As the rotational speed of the clutch increases, the force at its free end, due to drag on the low-speed input member, decreases, becomes zero, and eventually is reversed in direction when the speed of the clutch exceeds that of the low-speed input. The twisting couple now is reversed in direction, and twists the spring towards the low-speed input and away from the high-speed input, thus causing the output to decelerate. The output never can reach the speed of the high-speed input, and so the drive is inoperable. When the free end of the clutch is in contact with the high-speed input member and rotation is in the high-speed direction, the twisting couple moves and maintains the spring out of contact with the low-speed input member. This arrangement is therefore operable in the high-speed direction of rotation. An analysis similar to the preceding shows that it is also operable in the low-speed direction, since the speed of the clutch never exceeds or even equals the speed of the high-speed input, and so no reversal of the direction of the twisting forces occurs.

It should also be noted that at least a region of the high-speed contact surface must be in contact with the high-speed input member in the stationary state and in both directions of rotation, but that the low-speed contact surface must not contact its input member during high-speed rotation, and need not contact its input member in the stationary state. It is only necessary that the clutch be so located and designed that the low-speed contact surface will engage its input member upon rotation in the low-speed direction, as a result of the action described in the foregoing.

The manner in which the invention operates and realizes various objects and advantages will be made clearer in the following detailed description of several examples, which is intended to be read with reference to the accompanying drawings, wherein:

Fig. 1 is a plan view, with parts broken away and parts in section, of a transmission constructed in accordance with the invention;

Fig. 2 is an elevational view, taken along the lines 2—2 of Fig. 1;

Figs. 3, 4 and 5 are fragmentary plan views, with parts broken away and parts in section, of modifications of the invention;

Fig. 6 is a fragmentary elevational sectional view, taken along the lines 6—6 of Fig. 5;

Figs. 7, 8, 9 and 10 are fragmentary plan views, with parts broken away, of other modifications of the invention; and Figs. 11 and 12 are plan views, with parts in section, of further modifications.

Referring to Figs. 1 and 2 of the drawings, there is shown therein a transmission device mounted between two vertical supporting side plates 10 and 11, secured together in proper relation by bolts 12 and spacers 13 extending transversely of the plates at each corner thereof. A transversely extending horizontal shaft 14 is rotatably mounted at opposite ends in suitable holes 15, 16 provided for this purpose in the supporting plates 10, 11. A collar 17 on the shaft 14 is provided with a set screw 18 whereby it may be fastened to the shaft in sliding contact with the inner surface of one of the supporting plates 10, to maintain the shaft in place. The shaft 14 may be coupled in any suitable manner to a driving motor (not shown), for example, at its projecting end 19, and in this particular embodiment of the invention such driving means suitably takes the form of a reversible synchronous motor of the kind commonly used in recording instruments, since the device shown is particularly adapted for use in translating a pen of a recording instrument.

A small gear 20 secured to the shaft 14 serves to drive a larger gear 21 secured to a countershaft 22 mounted parallel to the main shaft 14 and rotatably supported in suitable holes in the side plates 10, 11. Collars 23, 24 mounted toward the ends of the countershaft 22 in sliding engagement with the side plates 10, 11 serve to maintain the countershaft in proper position, while a small gear 25 on the countershaft serves to transmit rotary motion to a larger gear 26 that is secured to a sleeve 27 mounted coaxially of the principal shaft 14, and adapted to rotate with respect to such shaft. The arrangement is such that rotary motion of the shaft 14 in a given direction is transmitted by the gears 20, 21, the shaft 22, and the gears 25, 26 to the sleeve 27, which is thereby driven in the same direction as the main shaft 14, but at a lower speed, by reason of the relative sizes of the gears.

At one end 28, the sleeve 27 bears slidably against one side of the gear 20. For convenience in assembly, a bushing 29 is provided between the inner surface of the sleeve and the outer surface of the shaft. A section 30 of the sleeve 27, of reduced diameter, and shaft 14 define an annular space within which is disposed a coil spring 31 of stepped construction. The spring 31 includes a section 32 of reduced diameter, such that the interior surface of this portion of the spring, in the absence of rotational motion, frictional engages the surface of the shaft 14. The spring also has a section 33 of somewhat larger diameter, such that the outer surface of this section, in the absence of rotational motion, frictionally engages or is close to the interior surface of the reduced section 30 of the sleeve 27. The outer diameter of the reduced section 32 of the spring is such as to provide a definite clearance space between the outer surface of this portion of the spring and the inner surface of the sleeve, while the inner diameter of the enlarged section 33 of the spring is such as to provide a definite clearance space between the inner surface of this portion of the spring and the surface of the shaft.

The spring is free of attachment to the assembly at its reduced end, while at its enlarged end a turned-over portion 34 of the spring is pressed into a reduced side extension 35 of a gear 36 that is rotatably mounted on the shaft 14 and that represents the driven or output member of the assembly. It will be understood that the gear 36 is adapted to be attached in any suitable manner to the driven object (not shown), such as the pen of a recording instrument. The reduced side extension 35 of the gear 36 is rotatably disposed coaxially within an enlarged end section 37 of the sleeve 27. The gear 36 is therefore adapted to rotate with respect to the shaft 14, as well as with respect to the sleeve 27, but in any case it rotates as a unit with the spring 31 to which it is secured. The arrangement is such that the spring is confined between an end surface 38 of the bushing 29, and an end surface 39 of the gear extension 35, in the reduced section 30 of the sleeve 27.

Referring to the general description of the apparatus of my invention and of its operation given above, it will be seen that the gear 36 is the output member. The coil spring 31, which is the clutch, has its bound end 34 attached to the output member 36. The outer surface of the low-speed section 33 of the coil near its bound end is the low-speed contact surface, and is in light frictional contact with, or close to, the sleeve 27, which constitutes the low-speed input member. The inner surface of the high-speed section 32 of the coil near its free end is the high-speed contact surface. It is the region in light frictional contact with shaft 14 for actuating the spring and also for drive engagement with shaft 14, which is the high-speed input member. The driving means comprises a reversible synchronous motor (not shown) attached to shaft 14 at 19, and the gear train 20, 21, 25, 26.

In operation, counter-clockwise rotation of the shaft 14 (as viewed in Fig. 2) causes the reduced portion 32 of the coil spring 31 to grip the shaft 14, and simultaneously causes the enlarged portion 33 of the spring to withdraw from contact with the interior surface of the surrounding sleeve 27. This action is a consequence of the fact that a twisting couple is exerted on the spring (as explained above), causing it to wind up and so to assume a smaller diameter. Such twisting couple is exerted on the spring by reason of the frictional engagement of the reduced section 32 of the spring with the driving shaft 14, and the inertial and frictional resistance of the load or driven member. The spring therefore turns with the shaft in the counter-clockwise direction at the same speed as the shaft, and since the driven gear member 36 is rigidly attached to the spring at 34, such driven member also rotates in a counter-clockwise direction at the same speed as the driving shaft 14. In this phase of the operation, the surrounding sleeve 27 is also being driven in a counter-clockwise direction, at a speed lower than the speed of the driving shaft 14 by reason of the gear train 20, 21, 25 and 26 interconnecting these members, but such rotation of the sleeve has no effect on the driven member, since the spring is disengaged from the sleeve, which simply slides on the reduced extension 35 of the driven gear and on the bushing 29 separating it from the shaft 14.

In the event of a tendency for the driven member 36 to rotate more rapidly than shaft 14 in the counter-clockwise direction, the enlarged portion 33 of the spring expands against the internal surface 30 of the sleeve which is rotating more slowly than the shaft, thus introducing a braking action which limits the rotational speed of the driven member to that of the shaft. Backlash is present only to the extent of the rotation of the driven member relative to shaft necessary to expand the enlarged portion of the spring against the internal surface of the sleeve or to tighten it on the shaft.

In the other phase of operation of the device, clockwise rotation of the shaft 14 unwinds the spring 31, by reason of the twisting couple formed by the frictional force between the surface of the driving shaft and the reduced portion 32 of the spring, and the force due to the resistance of the driven load. This results in a loosening of the reduced section of the spring on the shaft, with a simultaneous outward tightening of the enlarged portion 33 of the spring against the interior surface 30 of the surrounding sleeve 27. In this condition, the spring therefore merely slips with respect to the shaft, but the spring engages and is driven by the sleeve. The sleeve, in turn, is being driven in a clockwise direction at a lower speed than the driving shaft by the gear train 20, 21, 25 and 26. Therefore, the spring also rotates in a clockwise direction at the lower speed, and by reason of the rigid connection 34 between the spring and the driven gear 36, such driven member also rotates in a clockwise direction at the lower speed. In this phase of operation the driven member slips on the driving shaft 14.

Should there be a tendency for the output member 36 to rotate more rapidly than the sleeve 27, the enlarged portion 33 of the spring will tend to tighten away from the internal surface of the sleeve and to slip thereagainst at a speed greater than that of such surface. Should the output member tend to rotate more rapidly than the shaft, the spring will disengage entirely from the surface of the sleeve and will tighten on and rotate at the speed of the shaft. In the clockwise mode of operation the output member can thus over-run the speed of the sleeve to the extent of the speed of the shaft.

It will be apparent that reversal of the parts of the apparatus as described produces a device capable of equivalent results; that is, if the reduced and enlarged portions of the coil spring are interchanged as shown in Fig. 3 so that the free end 45 of the spring is normally in slipping contact with the outer sleeve 46 while the end 47 secured to the output member 48 is normally in slipping contact with, or at least in close proximity to, the shaft 49, the manner of operation will be similar, provided the gearing 50, 51, 52, 53 is such that the sleeve rotates at a higher speed than the shaft. In the apparatus of Fig. 3 the high-speed direction of rotation is clockwise, as viewed in the direction of the arrow A.

It will also be apparent that the sense of the spiral of the coil spring in Figs. 1 or 3 may be right handed instead of left handed as shown, the only effect of such change being to interchange the high- and low-speed directions. Such a reversedly coiled spring 55, operable in the apparatus of Fig. 3, is shown in Fig. 4.

In a modification of the invention shown in Figs. 5 and 6, a reduced section 60 of the spring 61 is contained within a larger section 62. The spring is wound from a continuous length of wire. The inner surface of the sleeve 63 is in light frictional contact with or in close proximity to the outer section 62 of the spring, which is wound back over the inner section 60; the inner section 60 is in light frictional contact with the shaft 64. A spur 65 at the outer end of the spring serves to secure the spring to the output member 66. The inner shaft 64 and the outer sleeve 63 are rotated in the same direction at a relatively high speed and a relatively low speed respectively by a gear mechanism such as is described in connection with Figs. 1 and 2. The manner of operation is essentially analogous and so need not be repeated here.

In Fig. 7 a modification of the invention is shown similar to the device of Fig. 1 except as to the construction of coil spring 70. The spring 70 is uniformly cylindrical and has one end 71 attached to output member 72. When the apparatus is at a standstill, the inside surface 73 of the spring 70 is in light frictional contact with the high-speed input member or shaft 75, and its external surface 76 is at a slight clearance from the low-speed input member or sleeve 77. Counter-clockwise rotation of shaft 75 as viewed from A, tightens the spring 70 on shaft 75, and drives the output member 72 at high speed. Clockwise rotation expands the spring 71, causing at least the portion near the attached end to engage the inner surface of the sleeve 77 and drive the output member 72 at low speed. In this form of the clutch, the entire inside surface 73 of the spring is the high-speed contact surface for drive engagement and spring actuation with the high-speed input member, and a portion of the outside surface 76 of the spring is the low-speed contact surface.

In Fig. 8 the parts of the apparatus are the same as in Fig. 7 except that a sleeve or contact member 80 on the high-speed input member or shaft 81 is attached to the free end 82 of the coiled spring 83. In this form, when the apparatus is at a standstill, the coiled spring 83 fits with a slight clearance both externally with respect to the low-speed input sleeve 84 and internally around high-speed input member or shaft 81, while the inside surface 85 of sleeve 80 makes a light frictional contact with shaft 81, sufficient to twist the spring 83 when the shaft 81 is rotated. This action is substituted for the light frictional contact between the internal surface 73 of the spring 70 and the external surface of shaft 75 in the form of Fig. 7. In the form of Fig. 8, sleeve 80 is the contact member of the clutch; its inner surface 85 forms the region of the high-speed contact surface in frictional contact with the high-speed input member 81. Sleeve 80 absorbs most of the wear otherwise directed to the spring 83 and can be replaced, if need be, at less cost than the spring. If desired, sleeve 80 may be a split resilient ring to provide take-up for wear in the sleeve. This form of the invention has the further advantage that the spring need not be made to the exact dimensional tolerance which is required when the spring itself makes the permanent light frictional contact with the high-speed input member.

In the modification shown in Figs. 9 and 10, the spring 90 is wound with a relatively high pitch, as shown in Fig. 9. Upon assembly in the transmission, as shown in Fig. 10, the spring is compressed longitudinally, the end surface 91 of the last turn at the free end being thus pressed against the end surface of a collar 92. The shaft 93 and the sleeve 94 are the input members, and the gear 95 is the output member. The collar 92 is fastened by means not shown either to the shaft 93 or to the sleeve 94, whichever is the high-speed input member, thereby becoming in effect an integral part of the high-speed input member. The coil spring is made to have a small but non-critical clearance from the surface of the shaft 93 and from the inner surface of the sleeve 94. The manner of operation of this form is similar to that of the other forms, except that the frictional force for actuating the spring is supplied by contact of the surface at the spring's free end, which is perpendicular to the axis of rotation, with the corresponding end surface of the collar 92. It is evident that this modification has the advantages of reduced spring wear and less exact dimensional tolerances in the spring which were mentioned in connection with the modification of Figure 8. It is also evident that a contact member similar to 80 in Fig. 8 may be incorporated in the modification of Figs. 9 and 10.

The embodiment of the invention depicted in Fig. 11 comprises a reversible driving motor 110 attached to a rotary shaft 111 bearing a small gear 112 and a larger gear 113. A fixed shaft 114 is mounted parallel to the rotary shaft and serves as a mounting for two rotary input members 115, 116 disposed coaxially thereof. One such rotary member 115 (the low-speed input member) carries a large gear 117 that meshes with the small gear 112 on the drive shaft, while the other rotary member 116 (the high-speed input member) carries a small gear 118 that meshes with the large gear 113 on the drive shaft. The two input members 115, 116 meet in slipping end-to-end contact at an interface 119. The output member is represented by a sleeve assembly, designated as 120, that overlaps and bears slidably on the two input members. To make it possible to assemble the spring inside the sleeve assembly, the latter is made in two parts 121 and 122, which are bolted together at the flanges 124 after assembly. Confined between the inner surface of the output assembly 120 and the outer surfaces of the input members is a coil spring. The end 123 of the coil spring adjacent to the low-speed input member 115 is attached to the output member at 122. The low-speed section 125 of the spring adjacent the fixed end 123 is wound in a certain sense about the low-speed input member 115, and after passing the interface 119 between 115 and 116, the succeeding high-speed section 126 of the spring is wound in an opposite sense about the high-speed input member 116. In the absence of rotational motion, the inner surface of section 126 makes light frictional contact with member 116; the inner surface of section 125 makes light frictional contact with or is in close proximity to member 115. When the input members are driven in a clockwise direction as viewed in the direction of the arrow A, the section 126 cooperating with the high-speed input 116 will be wound tightly on such input thereby transmitting the high speed through the spring to the output assembly. At the same time the remaining section 125 of the spring, since it is wound in the reverse sense, will unwind, and become and remain completely disengaged from the low-speed input member 115. In the counter-clockwise direction of rotation, the section 126 will expand outwardly and slip on the high-speed input 116, while the oppositely wound remaining section 125 of the spring will tighten on the low-speed input 115, thereby transmitting low speed rotation to the output.

In the modification of the invention illustrated in Fig. 12 a similar arrangement of motor 200, rotary shaft 201 and large and small gears 202, 203 transmits motion to a high-speed input member 204 and a low-speed input member 205. The inner ends of the input members abut each other slidably at an interface 206. A central rotary shaft 207 has an output member 208 fixed thereto, and such shaft also serves as a support for the high-speed input member 204 which is rotatably mounted thereon. The low-speed input member 205 is rotatably supported on a reduced section 209 of the output member 208. A coil spring 210 disposed between the inner surfaces of the input members and the outer surface of the shaft 207 has a fixed end 211 secured in the output member 208. A section 212 of the spring adjacent such fixed end and corresponding to the low-speed input is wound in a certain sense, while the remaining section 213 of the spring corresponding to the high-speed input is wound in the opposite sense. In the absense of rotational motion of the transmission, the spring section 213 is in light frictional engagement with the input member 204, and the spring section 212 is in light frictional engagement with or in close proximity to the input member 205; both spring actions have a definite clearance space from the shaft 207. It is apparent that clockwise rotation of the inputs as viewed in the direction of the arrow A will cause the spring sections to be twisted in such a way that section 212 will be expanded against the low-speed input member 205, resulting in positive non-slipping frictional engagement between them, while section 213 will contract away from the high-speed input member 204, and will slip thereon. Thus the output member 208 will be positively driven in a clockwise direction at the low speed. Counter-clockwise rotation of the inputs will twist the spring in the opposite direction, causing section 212 to be disengaged from contact with low-speed member 205, and expanding section 213 so that it makes positive non-slipping frictional engagement with high-speed input member 204, driving the output member 208 counter-clockwise at the high-speed.

From the foregoing it will be apparent that the invention provides a simple and automatic means for changing from a high speed in one direction to a low-speed in an opposite direction or vice versa by a simple reversal of the motor or other driving means. It will also be apparent that many forms of the invention other than those given herein by way of illustration are possible, and that the scope of the invention is not limited to these examples, but only as set forth in the following claims.

Having thus described my invention, what I claim and desire to protect by Letters Patent is:

1. A transmission for driving a rotating member at a desired higher speed in one direction and at a desired lower speed in the opposite direction, comprising an input assembly comprising two axially symmetrical input members, namely a high-speed input member and a low-speed input member, each rotatably mounted with respect to an axis common to both, driving means adapted to simultaneously drive the high-speed input member at the desired higher speed and the low-speed input member at the desired lower speed in a common direction, and to reverse the direction of rotation of the two input members simultaneously without changing their respective rotational speeds, an output member mounted to rotate with respect to the said axis, an axially symmetrical clutch, rotatably mounted with its axis on said axis, and comprising a coil spring attached at one end to said output member, said clutch being otherwise free from fixed attachment to said input and output members and making frictional contact with said high-speed input member at least in a region adjacent to the unattached end of said coil spring; said input members and clutch being so designed and arranged that, for said one direction of rotation of the input members, the frictional force exerted on the clutch by the high-speed input member and the force (due to the frictional and inertial resistance of the output member) exerted at the attached end of the spring twist the spring in one sense and cause a change in the radial dimensions of the coil, thereby forcing at least a part of the spring into non-slipping frictional engagement with the high-speed input member and maintaining the spring out of the contact with the low-speed input member, thus driving the output member at said higher speed in said one direction; while for said opposite direction of rotation of said input members said forces twist said spring in the opposite sense, thereby forcing at least a part of the spring into non-slipping frictional engagement with the low-speed input member and permitting only light slipping frictional engagement between the clutch and the high-speed input member, thus driving the output member at said lower speed in said opposite direction.

2. A transmission as claimed in claim 1, wherein the input assembly comprises a shaft as one input member and a member having a cylindrical inner surface as the second input member, said cylindrical inner surface being coaxial with and extending around at least a portion of said shaft and having a diameter greater than the diameter of said shaft, an annular space thus being defined by the surface of said shaft and said cylindrical inner surface; and wherein the coil spring is disposed in said annular space.

3. A transmission as claimed in claim 1, wherein the input assembly comprises a shaft as one input member and a member having a cylindrical inner surface as the second input member, said cylindrical inner surface being coaxial with and extending around at least a portion of said shaft and having a diameter greater than the diameter of said shaft, an annular space thus defined by the surface of said shaft and said cylindrical inner surface; and wherein the clutch comprises a coil spring of uniform diameter and a contract member attached to the free end of the spring, both disposed in said annular space, the inside diameter of the coil being slightly greater than the outside diameter of said shaft and the outside diameter of the coil being slightly less than the inside diameter of said second input member, the contact member being of such shape and dimensions that it makes frictional contact with a surface of the high-speed input member and is separated by a definite clearance from the low-speed input member.

4. A transmission as claimed in claim 1, wherein the input assembly comprises a shaft as one input member and a member having a cylindrical inner surface as the second input member, said cylindrical inner surface being coaxial with and extending around at least a portion of said shaft and having a diameter greater than the diameter of said shaft, an annular space thus being defined by the surface of said shaft and said cylindrical inner surface; and wherein the clutch comprises a coil spring having one section of smaller diameter corresponding to said one input member at one end of its winding and another section of larger diameter corresponding to said second input member at the other end of its winding, said coil spring being disposed in said annular space.

5. A transmission as claimed in claim 4, wherein the winding of the spring section of smaller diameter is contained within the winding of the spring section of larger diameter.

6. A transmission as claimed in claim 1, wherein the input assembly comprises two input members having cylindrical outer surfaces, and wherein the clutch comprises a coil spring having one section wound in one sense around, and in light frictional contact over at least a part of its inner surface with, an outer surface of the high-speed input member, and having another section wound in the opposite sense around and with at least a part of its inner surface close to the outer surface of the low-speed input member.

7. A transmission as claimed in claim 1, wherein the input assembly comprises two input members having cylindrical inner surfaces, and wherein the clutch comprises a coil spring having one section wound in one sense with at least a part of its outer surface in light frictional contact with an inner surface of the high-speed input member, and having another section wound in the opposite sense with at least at part of its outer surface close to an inner surface of the low-speed input member.

8. A transmission as claimed in claim 1, wherein the clutch includes a contact member attached to the free end of the spring, said contact member making frictional contact with a surface of the high-speed input member.

9. A transmission as claimed in claim 1, wherein the clutch includes a coil spring under longitudinal compression and the contact surface is at the free end of the clutch assembly, perpendicular to the axis of rotation and in contact with a corresponding contact surface of the high-speed input member.

References Cited in the file of this patent

UNITED STATES PATENTS

| | | |
|---|---|---|
| 2,494,960 | Pepper | Jan. 17, 1950 |
| 2,622,450 | Gorske | Dec. 23, 1942 |
| 2,670,826 | Sussdorff | Mar. 2, 1954 |